(12) United States Patent
Yang et al.

(10) Patent No.: US 12,705,297 B2
(45) Date of Patent: Aug. 11, 2026

(54) INFORMATION PROCESSING METHOD, ELECTRONIC DEVICE, AND STORAGE MEDIUM FOR RESPONDING TO TARGET LINK ACCORDING TO REQUEST INFORMATION AND PRE-AGREED INTERACTION PROTOCOL

(71) Applicant: Beijing Zitiao Network Technology Co., Ltd., Beijing (CN)

(72) Inventors: Yizhe Yang, Beijing (CN); Liuyuan Yu, Beijing (CN); Junzhou Yang, Beijing (CN); He Zhao, Beijing (CN); Tao Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/860,267

(22) PCT Filed: Apr. 21, 2023

(86) PCT No.: PCT/CN2023/089782

§ 371 (c)(1),
(2) Date: Oct. 25, 2024

(87) PCT Pub. No.: WO2023/207788

PCT Pub. Date: Nov. 2, 2023

(65) Prior Publication Data

US 2025/0258884 A1 Aug. 14, 2025

(30) Foreign Application Priority Data

Apr. 27, 2022 (CN) ........................ 202210454957.8

(51) Int. Cl.
*G06F 16/955* (2019.01)

(52) U.S. Cl.
CPC ............................... *G06F 16/9558* (2019.01)

(58) Field of Classification Search
CPC .. G06F 16/958; G06F 16/9558; G06F 16/955; G06F 16/957; G06F 16/9538; G06F 16/9577; G06F 40/106; G06F 16/904
See application file for complete search history.

(56) References Cited

U.S. PATENT DOCUMENTS 10,346,514 B2 7/2019 Kim et al.
2008/0215678 A1* 9/2008 Coletrane .............. H04L 51/04 709/204

(Continued)

FOREIGN PATENT DOCUMENTS

CN 102098234 A 6/2011
CN 104298666 A 1/2015

(Continued)

OTHER PUBLICATIONS

ISA China National Intellectual Property Administration, International Search Report and Written Opinion Issued in Application No. PCT/CN2023/089782, Jul. 7, 2023, WIPO, 14 pages.

(Continued)

*Primary Examiner* — William P Bartlett
(74) *Attorney, Agent, or Firm* — Alleman Hall LLP

(57) ABSTRACT

The present disclosure provides an information processing method and apparatus, an electronic device, and a storage medium. The information processing method comprises: in response to a registration operation of a service party, saving the registration information of the service party, the registration information comprising a link registered by the service party; and in response to request information transmitted by a target terminal and related to a target link, determining a target service party of the target link according to the registration information, and transmitting a notification to the target service party, so that the target service party responds to the target link according to the request information and a pre-agreed interaction protocol, wherein (Continued)

in response to a registration operation of a service party, save registration information of the service party — S1 in response to request information transmitted by a target terminal and related to a target link, determine a target service party of the target link according to the registration information, and transmit a notification to the target service party, so that the target service party responds to the target link according to the request information and a pre-agreed interaction protocol — S1 the interaction protocol is used for specifying a response mode of the service party to link-related different information.

20 Claims, 4 Drawing Sheets

(56) References Cited

U.S. PATENT DOCUMENTS

| | | | | |
|---|---|---|---|---|
| 2013/0151936 | A1 * | 6/2013 | Hsu | G06F 16/957 707/E17.046 |
| 2014/0164909 | A1 * | 6/2014 | Graff | G06F 16/957 715/234 |
| 2014/0250197 | A1 * | 9/2014 | Choi | H04L 51/08 709/206 |
| 2014/0379824 | A1 | 12/2014 | Wang et al. | |
| 2015/0193389 | A1 * | 7/2015 | Rose | G06F 16/9558 715/208 |
| 2017/0230320 | A1 * | 8/2017 | Knight | H04L 51/10 |
| 2020/0097614 | A1 * | 3/2020 | Borkar | G06F 3/0483 |
| 2020/0272669 | A1 * | 8/2020 | Ebbesen | G06F 16/9538 |
| 2021/0336912 | A1 * | 10/2021 | Ahn | H04N 7/147 |
| 2021/0365521 | A1 * | 11/2021 | Yusuf | G06F 16/248 |

FOREIGN PATENT DOCUMENTS

| | | | |
|---|---|---|---|
| CN | 104618439 | A | 5/2015 |
| CN | 104699725 | A | 6/2015 |
| CN | 108009836 | A | 5/2018 |
| CN | 113569167 | A | 10/2021 |
| CN | 113688417 | A | 11/2021 |
| CN | 113885757 | A | 1/2022 |
| CN | 114168869 | A | 3/2022 |
| CN | 114861106 | A | 8/2022 |
| JP | 2017079063 | A | 4/2017 |

OTHER PUBLICATIONS

China National Intellectual Property Administration, Office Action and Search Report Issued in Application No. 202210454957.8, Jan. 24, 2025, 18 pages.

Japan Patent Office, Office Action Issued in Application No. 2024563200, Oct. 21, 2025, 8 pages.

China National Intellectual Property Administration, Notice of Allowance Issued in Application No. 202210454957.8, Dec. 1, 2025, 10 pages.

* cited by examiner

INFORMATION PROCESSING METHOD, ELECTRONIC DEVICE, AND STORAGE MEDIUM FOR RESPONDING TO TARGET LINK ACCORDING TO REQUEST INFORMATION AND PRE-AGREED INTERACTION PROTOCOL

CROSS-REFERENCE TO RELATED APPLICATIONS

This application is a U.S. National Stage under 35 U.S.C. § 371 of International Application No. PCT/CN2023/089782, as filed on Apr. 21, 2023, which is based on and claims the priority to the Chinese patent application No. 202210454957.8 entitled "INFORMATION PROCESSING METHOD AND APPARATUS, ELECTRONIC DEVICE, AND STORAGE MEDIUM" and filed on Apr. 27, 2022, the disclosure of each of these applications is incorporated herein by reference in its entirety.

TECHNICAL FIELD

The present disclosure relates to the field of computer technology, and in particular, to an information processing method and apparatus, an electronic device, and a storage medium.

BACKGROUND

A link, for example, a webpage link or a text link, has a corresponding preview view, in which a snapshot or brief information of a webpage or text is usually displayed, and which is usually pre-drawn and stored in a server, so that after one link is transmitted in a communication client, the communication client will transmit an obtaining request to the server, to obtain a preview view corresponding to the link from the server and display it.

SUMMARY

The present disclosure provides an information processing method and apparatus, an electronic device, and a storage medium.

The present disclosure adopts the following technical solutions.

In some embodiments, the present disclosure provides an information processing method, comprising:

in response to a registration operation of a service party, saving registration information of the service party, the registration information comprising a link registered by the service party; and in response to request information transmitted by a target terminal and related to a target link, determining a target service party of the target link according to the registration information, and transmitting a notification to the target service party, so that the target service party responds to the target link according to the request information and a pre-agreed interaction protocol, wherein the interaction protocol is used for specifying a response mode of the service party to link-related different information.

In some embodiments, the present disclosure provides an information processing apparatus, comprising:

a registration module configured to, in response to a registration operation of a service party, save registration information of the service party, the registration information comprising a link registered by the service party; and a communication module configured to, in response to request information transmitted by a target terminal and related to a target link, determine a target service party of the target link according to the registration information, and transmit a notification to the target service party, so that the target service party responds to the target link according to the request information and a pre-agreed interaction protocol, wherein the interaction protocol is used for specifying a response mode of the service party to link-related different information.

In some embodiments, the present disclosure provides an electronic device, comprising: at least one memory and at least one processor, wherein the memory is configured to store program code, and the processor is configured to call the program code stored in the memory to perform the above method.

In some embodiments, the present disclosure provides a computer-readable storage medium configured to store program code which, when run by a processor, causes the processor to perform the above method.

BRIEF DESCRIPTION OF THE DRAWINGS

The above and other features, advantages, and aspects of the embodiments of the present disclosure will become more apparent by combining the accompanying drawings and referring to the following DETAILED DESCRIPTION. Throughout the drawings, the same or similar reference numbers denote the same or similar elements. It should be understood that the drawings are schematic and that components and elements are not necessarily drawn to scale.

DETAILED DESCRIPTION

Figure 1:
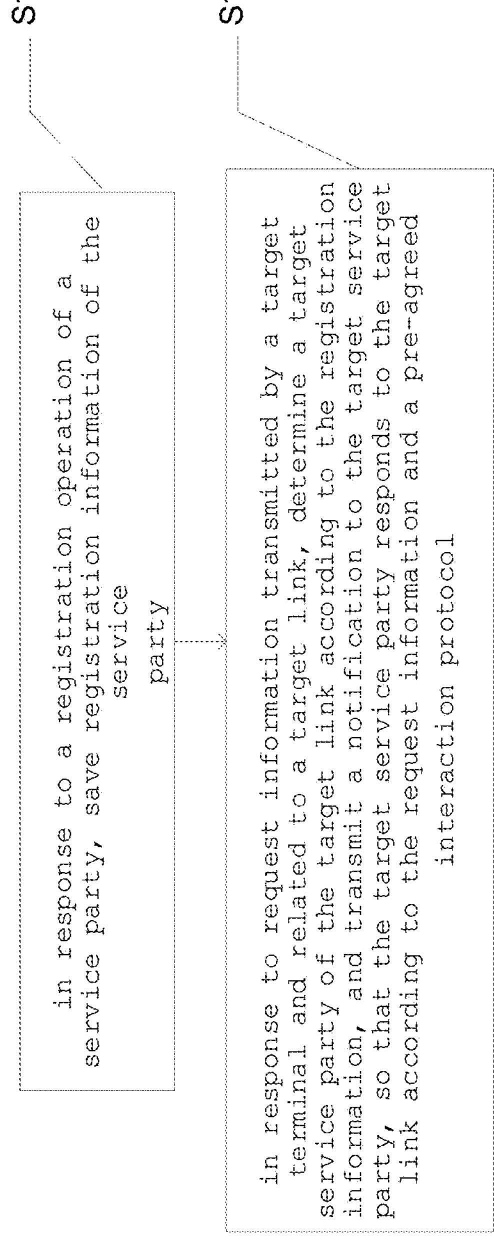
FIG. 1 is a flow diagram of an information processing method according to an embodiment of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, which are provided for a more complete and thorough understanding of the present disclosure instead. It should be understood that the drawings and the embodiments of the present disclosure are for exemplary purposes only and are not intended to limit the scope of the present disclosure.

It should be understood that various steps recited in method embodiments of the present disclosure may be executed in a different order and/or in parallel. Furthermore, the method embodiments may include additional steps and/or omit performing the illustrated steps. The scope of the present disclosure is not limited in this respect.

The term "including" and variations thereof as used herein are intended to be open-ended, i.e., "including but not limited to". The term "based on" is "at least partially based on". The term "one embodiment" means "at least one embodiment"; the term "another embodiment" means "at least one additional embodiment"; and the term "some embodiments" means "at least some embodiments". Definitions related to other terms will be given in the following description.

It should be noted that the concepts "first", "second", and the like mentioned in the present disclosure are only used for distinguishing different devices, modules or units, and are not used for limiting the order or interdependence of the functions performed by the devices, modules or units.

It should be noted that the modification of "a" mentioned in the present disclosure are intended to be illustrative rather than restrictive, and that those skilled in the art should appreciate that it should be understood as "one or more" unless otherwise explicitly stated in the context.

Names of messages or information exchanged between a plurality of devices in the embodiments of the present disclosure are for illustrative purposes only, and are not intended to limit the scope of the messages or information.

A detailed description of the solutions provided in the embodiments of the present disclosure will be made below in conjunction with the accompanying drawings.

In an instant messaging client, a link is often transmitted, and after the link is transmitted or received, a preview view of the link needs to be displayed, thereby improving usage experience of users; the preview view is usually pre-stored by a third-party service party on a server of the instant messaging client, and the service party needs to store the preview view in the server according to a specification provided by the server; with this method, maintainers of the server need interfacing with the service party, and as the number of service parties increases, the number of the maintainers will significantly increase, resulting in high access cost and difficulty in meeting requirements; in addition, the user's operation on the link through the client is often by: storing a response mode by the service party in the server of the instant messaging client, and responding by the server of the instant messaging client. In this way, if the service party wants to modify the response mode or data, etc., it needs to interact with the server of the instant messaging client, causing inconvenience.

According to the information processing method provided by the embodiments of the present disclosure, each service party responds according to an interaction protocol, rather than pre-storing data by each service party in a server of an instant messaging client, which avoids the need for a maintainer interfacing with each service party, and since data flows from the server to the service party, each service party only needs to prepare data according to the interaction protocol, reducing the development cost, and facilitating personalized processing of each service party according to his own needs, so that when data of the response is modified, there is no need to perform any operation on the server, reducing the communication cost.

As shown in FIG. 1, FIG. 1 is a flow diagram of an information processing method according to an embodiment of the present disclosure, comprising the following steps.

S11: in response to a registration operation of a service party, saving registration information of the service party.

In some embodiments, an executor of the information processing method provided by the present disclosure may be a server, specifically, a server of an instant messaging client, and in some embodiments, the service party may be a provider of content corresponding to a link. For example, if the link is a video link, the service party can be a server of a video website, and if the link is a document link, the service party can be a server of a document website. The registration information may include a link registered by the service party, and the service party may provide a preview view for the link, the preview view being generated through preview data.

S12: in response to request information transmitted by a target terminal and related to a target link, determining a target service party of the target link according to the registration information, and transmitting a notification to the target service party, so that the target service party responds to the target link according to the request information and a pre-agreed interaction protocol.

In some embodiments, the interaction protocol is used for specifying a response mode of the service party to link-related different information. The target terminal may be a target terminal where the instant messaging client is located, and the target terminal may transmit request information to the server when the instant messaging client receives a target link transmitted by another terminal or when a user inputs a target link in the instant messaging client. The request information may be used for obtaining preview data of the target link, or may be used for causing the service party to perform some processing. The target terminal is a terminal served by the server, and the service party registers the target link in the server, so that after receiving the request information, the server parses the target link in the request information and determines a target service party having registered the target link from each service party according to the registration information. The parsing mode can be: obtaining a main domain name of the target link and determining a target service party of the target link through the main domain name, and after the target service party is determined, transmitting a notification to the target service party. The notification may include request information, and the notification may be generated according to the request information; an interaction protocol is pre-agreed between the service party and the server, in which a response mode of the service party is specified, so that the service party determines a response mode corresponding to the request information according to the interaction protocol and responds.

In some embodiments of the present disclosure, the service party only performs registration on the executor of the present disclosure, while the response to the link is executed by the service party; the data flow adopted in the embodiments of the present disclosure is from the executor of the present disclosure to the target service party, each service party provides data conforming to the interaction protocol or performs an operation conforming to the interaction protocol, rather than pre-storing data by each service party in the executor of the present disclosure to respond to the target link, which avoids the need for a maintainer interfacing with each service party, and each service party only needs to prepare data and respond to the operation according to the interaction protocol, reducing the development cost and facilitating personalized processing of each service party according to its own needs; when data returned due to the response needs to be modified, there is no need to interact with the executor of the present disclosure, reducing the maintenance cost.

In some embodiments of the present disclosure, the transmitting a notification to the target service party, so that the target service party responds to the target link according to the request information and a pre-agreed interaction protocol, comprises: transmitting the notification to the target service party according to a type of the request information, so that the target service party returns preview data corresponding to the type of the request information, wherein the type of the request information is associated with a state of the target link in the target terminal. The method further comprises: in response to the preview data transmitted by the target service party, transmitting the preview data to the target terminal so that the target terminal generates a preview view of the target link.

In some embodiments of the present disclosure, the request information may be request information for a preview view of a target link that is transmitted by the instant messaging client. The request information reaches the executor of the present disclosure, which determines a target service party according to the target link and transmits the request information to the target service party, and the target service party processes the target link and finally returns preview data, and the target terminal receives the preview data and renders a preview card of the target link. In some embodiments, after the preview data is obtained from the target service party, the preview data may be directly forwarded to the target terminal. In other embodiments, the preview data may also be processed, and the processed preview data is forwarded to the target terminal, for example, a preview view template corresponding to the preview data may be determined according to the preview data, and the preview view template and the preview data are transmitted to the target terminal together, so that the target terminal generates a preview view according to the preview view template and the preview data.

In some embodiments of the present disclosure, the state of the target link in the target terminal includes: a to-be-transmitted state, a being-transmitted state, a transmitted state, a received state, etc., and the target terminal can transmit a different type of request information when the state of the target link in the target terminal is different, so that the request information transmitted by the target terminal can be one or more pieces, and when the state of the target link in the target terminal is different, a displayed preview view can be different, and a displayed position can be different, for example, when the target link is to be transmitted, a thumbnail preview view can be displayed and can be displayed in an information input box. When the target link has already been transmitted, a complete preview view may be displayed and may be displayed in a session interface. Since the user may not transmit the target link when it is to be transmitted, waste of data transmission may be caused if a complete thumbnail view is generated. After receiving the request information transmitted by the target terminal, a type of the request information is determined, and the preview data corresponding to different types of request information may be not completely the same, thereby realizing different preview views.

In some embodiments of the present disclosure, the transmitting the notification to the target service party according to a type of the request information, so that the target service party returns preview data of the target link, comprises: determining that the request information is first-type request information, and transmitting the notification to the target service party, so that the target service party returns first-type preview data of the target link, wherein the first-type request information is transmitted by the target terminal in response to a target message being located in an information input box, the target message comprising the target link, and the first-type preview data is used for generating a thumbnail preview view.

In some embodiments, when the target message is a message in the target terminal that contains the target link and the information input box is an input box for inputting information, the target message being in the information input box indicates that the target message has not been transmitted, a transmitted message is located in the session interface, at this time, the target terminal transmits first-type request information, after the first-type request information is received, first-type preview data is obtained from the target service party, and then the first-type preview data is transmitted to the target terminal, so that the target terminal generates a thumbnail preview view. In some embodiments, the first-type preview data may comprise an icon and a title, and the thumbnail preview view generated at this time is a preview view formed by the icon and the title, for example, when the target link is a document link, a document icon and a title of a document are generated, so that the user of the target terminal may directly know a type and title of the target link after inputting the target link in the information input box, without triggering the target link.

In some embodiments of the present disclosure, the transmitting the notification to the target service party according to a type of the request information, so that the target service party returns preview data of the target link, comprises: determining that the request information is second-type request information, and transmitting the notification to the target service party, so that the target service party returns second-type preview data of the target link, wherein the second-type request information is transmitted by the target terminal in response to receiving a target message in the session interface, the target message comprising the target link, and the second-type preview data is used for generating a complete preview view.

In some embodiments, in the target terminal, there may be an instant messaging client, and a target message is no longer located in the information input box after being transmitted to the session interface, and at this time, the target terminal generates second-type request information, the second-type request information transmitted by the target terminal is received, and second-type preview data will be obtained from the target service party. In some embodiments, the second-type preview data may comprise the first-type preview data and other data, and in other embodiments, if the first-type preview data has already been transmitted for the target terminal before, only other data in the second-type preview data than the first-type preview data may be transmitted to reduce the amount of data transmission. The second-type preview data is forwarded to the target terminal, so that the target terminal generates a complete preview view, wherein the complete preview view can differ from the thumbnail preview view in that: information of content corresponding to the target link is displayed in the complete preview view. For example, a complete preview view may display a thumbnail of content to which a target link corresponds, a summary of the content, etc., while a thumbnail preview view may not display the thumbnail of the content to which the target link corresponds.

In some embodiments of the present disclosure, the request information is the second-type request information, and before responding to the second-type request information transmitted by the target terminal and related to the target link, the method further comprises: in response to a first notification message transmitted by the target terminal and related to the target link, transmitting a notification to the target service party, to notify the target service party that the second-type preview data of the target link is to be obtained, wherein third-type request information is transmitted by the target terminal in response to transmitting the target message containing the target link.

In some embodiments, before the target message is located within the session interface, there is the need for performing an operation of transmitting the target message first, for example, when the target message is located in the information input box, a Transmit button or Enter is clicked, and the target terminal transmits the third-type request information before transmitting the second-type request information, because the data amount of the second-type preview data that is needed by a complete preview view is generally large, and both a transmitter and a receiver of the target message need generating a preview view, therefore, when the target message is transmitted, it shall be notified in advance, so that the target service party can make a preparation in advance, increasing the speed of obtaining the second-type preview data later.

In some embodiments of the present disclosure, the in response to request information transmitted by a target terminal and related to a target link, determining a target service party of the target link according to registration information, and transmitting a notification to the target service party, so that the target service party responds to the target link according to the request information and a pre-agreed interaction protocol, comprises: in response to fourth-type request information transmitted by the target terminal and comprising operation information, transmitting a notification comprising the operation information to the target service party, so that the target service party performs processing according to the operation information, and the method further comprises: receiving a processing result returned by the target service party, wherein the fourth-type request information is transmitted by the target terminal in response to performing the operation information on a target message, the target message comprising the target link.

In some embodiments, the user of the target terminal may perform the operation information on the target message. For example, after the target message is transmitted to the session interface, the message may be withdrawn, the message may be clicked for viewing, and a control on the target message may be clicked. For example, if the target link is a document link, a preview view of the document link may have therein displayed a permission management control, through which the user may manage a permission of a receiving user receiving the target message to a document. After the user of the target terminal performs the operation information, fourth-type request information is transmitted, and after the fourth-type request information is received, the target service party needs to be notified, that is, a notification is transmitted, so that the target service party can perform processing.

In some embodiments of the present disclosure, if the operation information is an operation of withdrawing the target message, the target service party performing processing according to the operation information, comprises: reclaiming a permission endowed by the target message in which the target link is located.

In some embodiments, the target message is located in the target terminal, and the target message may be withdrawn after being transmitted to the session interface; however, when the target message is located in the session interface, perhaps the user performs a permission operation through the target link, for example, if the target link is a document link, and the user endows another user a permission to edit or view the document through a preview view of the document link, at this time, after the target message is withdrawn, the permission operation performed through the preview view before the withdrawal will be cancelled, and the relevant permission endowed will be reclaimed.

In some embodiments of the present disclosure, the method further comprises: in response to receiving update data transmitted by the target service party, transmitting the update data to the target terminal, so that the target terminal updates the preview view of the target link. In some embodiments, for the target service party, it may actively modify the preview view corresponding to the target link. For example, after the title of the content of the target link is changed, the target service party transmits update data of the target link at this time, and after the update data is received, the update data is transmitted to the target terminal, so that the target terminal updates the preview view of the target link.

In some embodiments of the present disclosure, the in response to a registration operation of a service party, saving registration information of the service party, comprises: in response to a registration link request of the service party, determining a link to be registered; and detecting the link to be registered, and determining that the link to be registered is registered for the service party after the detection is passed.

In some embodiments, the service party needs to perform registration first, and taking an example that the information processing method provided by the present disclosure is used for a server, the service party needs to perform registration on the server first, a link needs to be associated upon the registration, and after the registration, the service party can perform operations such as view, edit, delete on its link.

In some embodiments of the present disclosure, the detecting the link to be registered comprises: loading the link to be processed into a memory, and matching the link to be processed with a registered link and with a permission range of the service party; if the link to be processed has not yet been registered and is located within the permission range of the service party, registering the link to be registered for the service party. In some embodiments, when the service party registers a link, there is the need for determining that the registered link is not an existing link to avoid a duplicate registration, and there is the need for determining that the service party has a permission to register the link, for example, for some known links for other companies, even if these other companies do not register these links, they cannot be registered without authorization of the other companies, to avoid malicious registrations.

Figure 2:
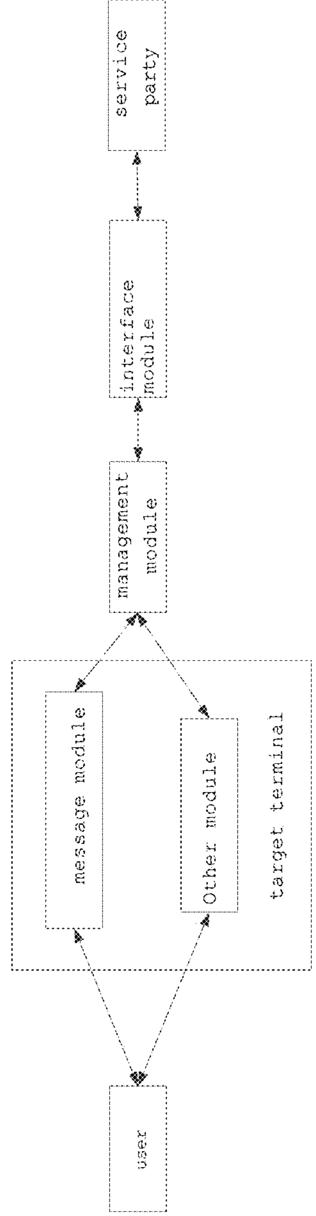
FIG. 2 is a schematic diagram of interaction parties of an information processing method according to an embodiment of the present disclosure.
Figure 2:
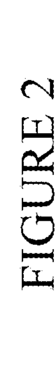
Figure 3:
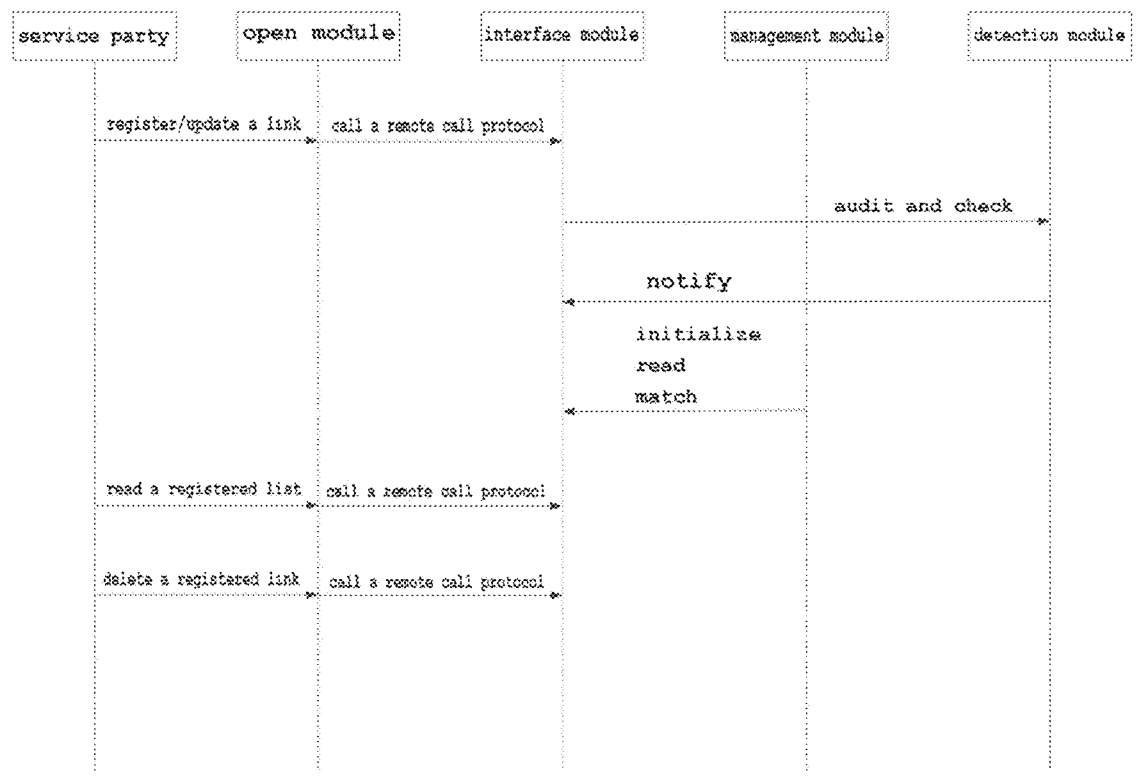
FIG. 3 is an interaction diagram of an information processing method according to an embodiment of the present disclosure.

To better illustrate the method provided in the embodiments of the present disclosure, a specific embodiment is provided below with reference to FIGS. 2 to 4. Taking an example that the information processing method provided in the present disclosure is used for a server of an instant messaging client in a target terminal, a management module, an interface module, an open module and a detection module in FIGS. 2 and 3 are modules of the server, the interface module is designed with a link preview access registry, and the management module stores related information of service party access, including information such as application information, tenant information, domain name, path, and callback address. The service party can initiate a registration for access through the open module, the interface module will perform conflict detection after the registration is initiated, after successful detection, it is initiated that an administrator performs detection, and after the detection is passed, the registration information will inform the interface module to modify registry information. Subsequently, the service party can view/manage the registered link through the open module.

Figure 4:
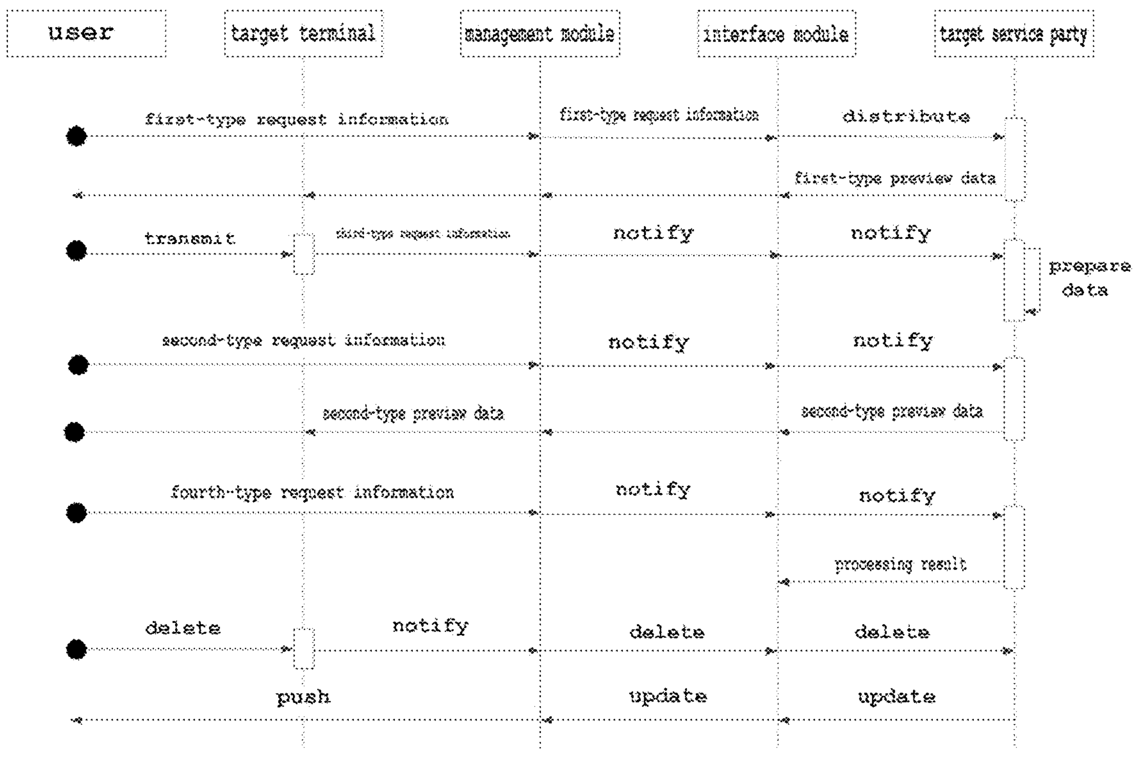
FIG. 4 is an interaction diagram of an information processing method according to an embodiment of the present disclosure.

A specific flow of the information processing method is shown in FIG. 4: when a target link is located in an information input box and has not yet been transmitted, a target terminal transmits first-type request information to a management module of a server through the target terminal, the server transmits the first-type request information to a target service party, the target service party returns first-type preview data, so that the target terminal generates a thumbnail preview view, the first-type preview data comprising a title and an icon, and the target terminal generates the thumbnail preview view in the information input box after receiving the first-type preview data. After a user transmits a target link through the target terminal, third-type request information is transmitted to the server, the server transmits a notification to the target service party so that the service party prepares second-type preview data in advance, after the target link is transmitted to a session interface, the target terminal transmits second-type request information to the server, and the server obtains the second-type preview data from the target service party and forwards the second-type preview data to the target terminal, so that a complete preview view is generated. The user can perform operation information on a target message containing the target link through the target terminal, at this time, fourth-type request information will be transmitted to the server, the server transmits a notification to the target service party, the service party will process the fourth-type request information and returns a processing result to the server, and the server can notify or not notify the target terminal according to different processing results. For example, the user withdraws the target message, and the target service party can perform permission reclaim, data destruction and the like; the user deletes the target message, and the server and the target service party can also be notified; the user clicks the preview view of the target link, a read request will be generated and transmitted to the server, the server forwards the read request to the target service party, the target service party returns read data to the server, the server forwards the read data to the target terminal, the target service party transmits update data to the server when updating the preview view of the target link, and the server pushes the update data to the target terminal to update the preview view of the target link.

Some embodiments of the present disclosure further provide an information processing apparatus, comprising:

a registration module configured to, in response to a registration operation of a service party, save registration information of the service party, the registration information comprising a link registered by the service party; and a communication module configured to, in response to request information transmitted by a target terminal and related to a target link, determine a target service party of the target link according to the registration information, and transmit a notification to the target service party, so that the target service party responds to the target link according to the request information and a pre-agreed interaction protocol, wherein the interaction protocol is used for specifying a response mode of the service party to link-related different information.

In some embodiments, the transmitting a notification to the target service party, so that the target service party responds to the target link according to the request information and a pre-agreed interaction protocol, comprises:

transmitting the notification to the target service party according to a type of the request information, so that the target service party returns preview data corresponding to the type of the request information, wherein the type of the request information is associated with a state of the target link in the target terminal; and the communication module is further configured to: in response to the preview data transmitted by the target service party, transmit the preview data to the target terminal, so that the target terminal generates a preview view of the target link.

In some embodiments, the transmitting the notification to the target service party according to a type of the request information, so that the target service party returns preview data of the target link, comprises:

determining that the request information is first-type request information, and transmitting the notification to the target service party, so that the target service party returns first-type preview data of the target link, wherein the first-type request information is transmitted by the target terminal in response to a target message being located in an information input box, the target message comprising the target link, and the first-type preview data is used for generating a thumbnail preview view.

In some embodiments, the transmitting the notification to the target service party according to a type of the request information, so that the target service party returns preview data of the target link, comprises:

determining that the request information is second-type request information, and transmitting the notification to the target service party, so that the target service party returns second-type preview data of the target link, wherein the second-type request information is transmitted by the target terminal in response to receiving a target message in a session interface, the target message comprising the target link, and the second-type preview data is used for generating a complete preview view.

In some embodiments, the request information is the second-type request information, and the communication module is further configured to, before responding to the second-type request information transmitted by the target terminal and related to the target link, in response to third-type request information transmitted by the target terminal and related to the target link, transmit a notification to the target service party to notify the target service party that the second-type preview data of the target link is to be obtained, wherein the third-type request information is transmitted by the target terminal in response to transmitting the target message comprising the target link.

In some embodiments, the in response to request information transmitted by a target terminal and related to a target link, determining a target service party of the target link according to the registration information, and transmitting a notification to the target service party, so that the target service party responds to the target link according to the request information and a pre-agreed interaction protocol, comprises: in response to fourth-type request information transmitted by the target terminal and comprising operation information, transmitting a notification comprising the operation information to the target service party, so that the target service party performs processing according to the operation information; and the communication module is further configured to: receive a processing result returned by the target service party, wherein the fourth-type request information is transmitted by the target terminal in response to performing the operation information on a target message, the target message comprising the target link.

In some embodiments, in response to that the operation information is an operation of withdrawing the target message, the target service party performing processing according to the operation information, comprises: reclaiming a permission endowed by the target message in which the target link is located.

In some embodiments, the communication module is further configured to, in response to receiving update data transmitted by the target service party, transmit the update data to the target terminal, so that the target terminal updates the preview view of the target link.

For the embodiments of the apparatus, since they substantially correspond to the method embodiments, reference is made to the partial description of the method embodiments for relevant points. The above apparatus embodiments are merely illustrative, wherein the modules described as separate modules may or may not be separate. Some or all of the modules may be selected according to actual needs to achieve the purpose of the solution of this embodiment. One of ordinary skill in the art can understand and implement them without paying creative labor.

The method and apparatus of the present disclosure have been described above based on the embodiments and application examples. In addition, the present disclosure also provides an electronic device and a computer-readable storage medium, which are described below.

Figure 5:
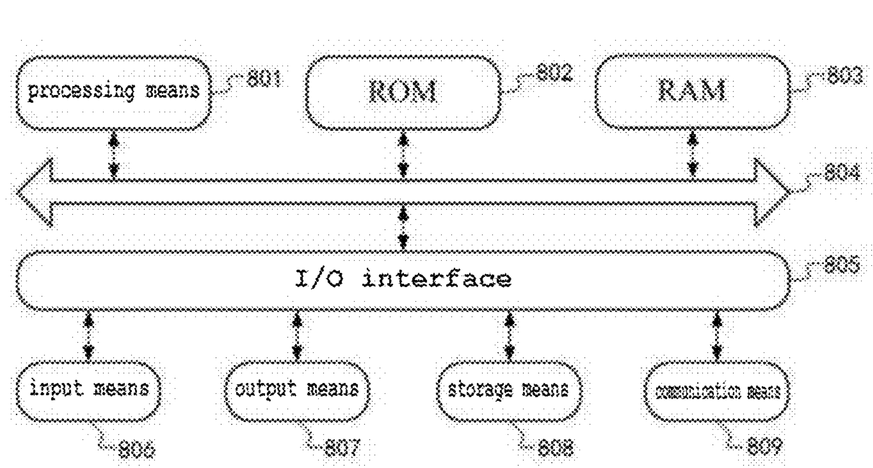
FIG. 5 is a schematic structural diagram of an electronic device according to an embodiment of the present disclosure.

Referring below to FIG. 5, it shows a schematic block diagram of an electronic device (e.g., a terminal device or server) 800 suitable for implementing an embodiment of the present disclosure. The terminal device in the embodiment of the present disclosure may include, but is not limited to, a mobile terminal such as a mobile phone, a notebook computer, a digital broadcast receiver, a PDA (Personal Digital Assistant), a PAD (Portable Android Device), a PMP (Portable Multimedia Player), and a vehicle-mounted terminal (e.g., a vehicle-mounted navigation terminal), and a fixed terminal such as a digital TV, and a desktop. The electronic device shown in the figure is only an example and should not bring any limitation to the functions and the scope of use of the embodiment of the present disclosure.

The electronic device 800 may include a processing means (e.g., a central processing unit, a graphics processing unit, etc.) 801 that may perform various appropriate actions and processes according to a program stored in a read-only memory (ROM) 802 or a program loaded from a storage means 808 into a random access memory (RAM) 803. In the RAM 803, various programs and data required for the operation of the electronic device 800 are also stored. The processing means 801, the ROM 802, and the RAM 803 are connected to each other by a bus 804. An input/output (I/O) interface 805 is also connected to the bus 804.

Generally, the following means may be connected to the I/O interface 805: an input means 806 including, for example, a touch screen, touch pad, keyboard, mouse, camera, microphone, accelerometer, gyroscope, etc.; an output means 807 including, for example, a liquid crystal display (LCD), speaker, vibrator, etc.; the storage means 808 including, for example, a magnetic tape, hard disk, etc.; and a communication means 809. The communication means 809 may allow the electronic device 800 to communicate wirelessly or by wire with other devices to exchange data. While the electronic device 800 with various means is illustrated in the figure, it should be understood that not all illustrated means are required to be implemented or provided. More or fewer means may be alternatively implemented or provided.

In particular, according to the embodiments of the present disclosure, the processes described above with reference to the flow diagrams may be implemented as a computer software program. For example, an embodiment of the present disclosure includes a computer program product comprising a computer program carried on a computer-readable medium, the computer program comprising program code for performing the method illustrated by the flow diagram. In such an embodiment, the computer program may be downloaded and installed from a network via the communication means 809, or installed from the storage means 808, or installed from the ROM 802. The computer program, when executed by the processing means 801, performs the above functions defined in the method of the embodiment of the present disclosure.

It should be noted that the above computer-readable medium of the present disclosure may be a computer-readable signal medium or a computer-readable storage medium or any combination of the two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some implementations, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may exist separately without being assembled into the electronic device.

The above computer-readable medium has one or more programs carried thereon, wherein the above one or more programs, when executed by the electronic device, cause the electronic device to perform the above method of the present disclosure.

Computer program code for performing the operation of the present disclosure may be written in one or more programming languages or a combination thereof, wherein the above programming language includes an object-oriented programming language such as Java, Smalltalk, and C++, and also includes a conventional procedural programming language, such as a "C" language or a similar programming language. The program code may be executed entirely on a user's computer, partly on a user's computer, as a stand-alone software package, partly on a user's computer and partly on a remote computer, or entirely on a remote computer or server. In a scenario where a remote computer is involved, the remote computer may be connected to a user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or part of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or by a combination of special-purpose hardware and computer instructions.

The involved units described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, a hardware logic component of an exemplary type that may be used includes: a field programmable gate array (FPGA), an application specific integrated circuit (ASIC), an application specific standard parts (ASSP), a system on chip (SOC), a complex programmable logic device (CPLD), and the like.

In the context of this disclosure, a machine-readable medium may be a tangible medium, which can contain or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided an information processing method, comprising:

in response to a registration operation of a service party, saving registration information of the service party, the registration information comprising a link registered by the service party; and in response to request information transmitted by a target terminal and related to a target link, determining a target service party of the target link according to the registration information, and transmitting a notification to the target service party, so that the target service party responds to the target link according to the request information and a pre-agreed interaction protocol, wherein the interaction protocol is used for specifying a response mode of the service party to link-related different information.

According to one or more embodiments of the present disclosure, there is provided an information processing method, wherein the transmitting a notification to the target service party, so that the target service party responds to the target link according to the request information and a pre-agreed interaction protocol, comprises:

transmitting the notification to the target service party according to a type of the request information, so that the target service party returns preview data corresponding to the type of the request information, wherein the type of the request information is associated with a state of the target link in the target terminal; and the method further comprises: in response to the preview data transmitted by the target service party, transmitting the preview data to the target terminal, so that the target terminal generates a preview view of the target link.

According to one or more embodiments of the present disclosure, there is provided an information processing method, wherein the transmitting the notification to the target service party according to a type of the request information, so that the target service party returns preview data of the target link, comprises:

determining that the request information is first-type request information, and transmitting the notification to the target service party, so that the target service party returns first-type preview data of the target link, wherein the first-type request information is transmitted by the target terminal in response to a target message being located in an information input box, the target message comprising the target link, and the first-type preview data is used for generating a thumbnail preview view.

According to one or more embodiments of the present disclosure, there is provided an information processing method, wherein the transmitting the notification to the target service party according to a type of the request information, so that the target service party returns preview data of the target link, comprises:

determining that the request information is second-type request information, and transmitting the notification to the target service party, so that the target service party returns second-type preview data of the target link, wherein the second-type request information is transmitted by the target terminal in response to receiving a target message in a session interface, the target message comprising the target link, and the second-type preview data is used for generating a complete preview view.

According to one or more embodiments of the present disclosure, there is provided an information processing method, wherein the request information is the second-type request information, and before responding to the second-type request information transmitted by the target terminal and related to the target link, the method further comprises:

in response to third-type request information transmitted by the target terminal and related to the target link, transmitting a notification to the target service party, to notify the target service party that the second-type preview data of the target link is to be obtained, wherein the third-type request information is transmitted by the target terminal in response to transmitting the target message comprising the target link.

According to one or more embodiments of the present disclosure, there is provided an information processing method, wherein the in response to request information transmitted by a target terminal and related to a target link, determining a target service party of the target link according to the registration information, and transmitting a notification to the target service party, so that the target service party responds to the target link according to the request information and a pre-agreed interaction protocol, comprises: in response to fourth-type request information transmitted by the target terminal and comprising operation information, transmitting a notification comprising the operation information to the target service party, so that the target service party performs processing according to the operation information; and the method further comprises: receiving a processing result returned by the target service party, wherein the fourth-type request information is transmitted by the target terminal in response to performing the operation information on a target message, the target message comprising the target link.

According to one or more embodiments of the present disclosure, there is provided an information processing method, comprising:

in response to that the operation information is an operation of withdrawing the target message, the target service party performing processing according to the operation information, comprising: reclaiming a permission endowed by the target message in which the target link is located.

According to one or more embodiments of the present disclosure, there is provided an information processing method, further comprising:

in response to receiving update data transmitted by the target service party, transmitting the update data to the target terminal, so that the target terminal updates the preview view of the target link.

According to one or more embodiments of the present disclosure, there is provided an information processing apparatus, comprising:

a registration module configured to, in response to a registration operation of a service party, save registration information of the service party, the registration information comprising a link registered by the service party; and a communication module configured to, in response to request information transmitted by a target terminal and related to a target link, determine a target service party of the target link according to the registration information, and transmit a notification to the target service party, so that the target service party responds to the target link according to the request information and a pre-agreed interaction protocol, wherein the interaction protocol is used for specifying a response mode of the service party to link-related different information.

According to one or more embodiments of the present disclosure, there is provided an electronic device, comprising: at least one memory and at least one processor, wherein the at least one memory is configured to store program code, and the at least one processor is configured to call the program code stored in the at least one memory to perform the method according to any of the above.

According to one or more embodiments of the present disclosure, there is provided a computer-readable storage medium configured to store program code which, when run by a processor, causes the processor to perform the above method.

The foregoing only illustrates the preferred embodiments of the present disclosure and the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing may be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

The invention claimed is:

1. An information processing method, comprising:

in response to a registration operation of a service party, saving registration information of the service party, the registration information comprising a link registered by the service party; and in response to request information transmitted by a target terminal and related to a target link, determining a target service party of the target link according to the registration information, and transmitting a notification to the target service party, so that the target service party responds to the target link according to the request information and a pre-agreed interaction protocol, wherein the transmitting the notification to the target service party, so that the target service party responds to the target link according to the request information and the pre-agreed interaction protocol, comprises:

transmitting the notification to the target service party according to a type of the request information, so that the target service party returns preview data corresponding to the type of the request information, wherein the type of the request information is associated with a state of the target link in the target terminal, and wherein the pre-agreed interaction protocol is configured for specifying a response mode of the service party to link-related different information.

2. The method according to claim 1, further comprising: in response to the preview data transmitted by the target service party, transmitting the preview data to the target terminal, so that the target terminal generates a preview view of the target link.

3. The method according to claim 2, wherein the transmitting the notification to the target service party according to a type of the request information, so that the target service party returns preview data of the target link, comprises:

determining that the request information is first-type request information, and transmitting the notification to the target service party, so that the target service party returns first-type preview data of the target link, wherein the first-type request information is transmitted by the target terminal in response to a target message being located in an information input box, the target message comprising the target link, and the first-type preview data is configured for generating a thumbnail preview view.

4. The method according to claim 2, wherein the transmitting the notification to the target service party according to a type of the request information, so that the target service party returns preview data of the target link, comprises:

determining that the request information is second-type request information, and transmitting the notification to the target service party, so that the target service party returns second-type preview data of the target link, wherein the second-type request information is transmitted by the target terminal in response to receiving a target message in a session interface, the target message comprising the target link, and the second-type preview data is configured for generating a complete preview view.

5. The method according to claim 4, wherein the request message is the second-type request information, and before responding to the second-type request information transmitted by the target terminal and related to the target link, the method further comprises:

in response to third-type request information transmitted by the target terminal and related to the target link, transmitting a notification to the target service party, to notify the target service party that the second-type preview data of the target link is to be obtained, wherein the third-type request information is transmitted by the target terminal in response to transmitting the target message comprising the target link.

6. The method according to claim 5, wherein in response to request information transmitted by a target terminal and related to a target link, determining a target service party of the target link according to the registration information, and transmitting the notification to the target service party, so that the target service party responds to the target link according to the request information and the pre-agreed interaction protocol, comprises: in response to fourth-type request information transmitted by the target terminal and comprising operation information, transmitting a notification comprising the operation information to the target service party, so that the target service party performs processing according to the operation information; and the method further comprises: receiving a processing result returned by the target service party, wherein the fourth-type request information is transmitted by the target terminal in response to performing the operation information on a target message, the target message comprising the target link.

7. The method according to claim 6, comprising:

in response to the operation information being an operation of withdrawing the target message, the target service party performing processing according to the operation information, comprising: reclaiming a permission endowed by the target message in which the target link is located.

8. The method according to claim 2, further comprising:

in response to receiving update data transmitted by the target service party, transmitting the update data to the target terminal, so that the target terminal updates the preview view of the target link.

9. An electronic device, comprising:

at least one memory and at least one processor, wherein, the at least one memory is configured to store program code, and the at least one processor is configured to call the program code stored in the at least one memory to perform an information processing method comprising:

in response to a registration operation of a service party, saving registration information of the service party, the registration information comprising a link registered by the service party; and in response to request information transmitted by a target terminal and related to a target link, determining a target service party of the target link according to the registration information, and transmitting a notification to the target service party, so that the target service party responds to the target link according to the request information and a pre-agreed interaction protocol, wherein the transmitting the notification to the target service party, so that the target service party responds to the target link according to the request information and the pre-agreed interaction protocol, comprises:

transmitting the notification to the target service party according to a type of the request information, so that the target service party returns preview data corresponding to the type of the request information, wherein the type of the request information is associated with a state of the target link in the target terminal, and wherein the pre-agreed interaction protocol is configured for specifying a response mode of the service party to link-related different information.

10. A non-transitory computer-readable storage medium configured to store program code which, when run by a processor, causes the processor to perform an information processing method comprising:

in response to a registration operation of a service party, saving registration information of the service party, the registration information comprising a link registered by the service party; and in response to request information transmitted by a target terminal and related to a target link, determining a target service party of the target link according to the registration information, and transmitting a notification to the target service party, so that the target service party responds to the target link according to the request information and a pre-agreed interaction protocol, wherein the transmitting the notification to the target service party, so that the target service party responds to the target link according to the request information and the pre-agreed interaction protocol, comprises:

transmitting the notification to the target service party according to a type of the request information, so that the target service party returns preview data corresponding to the type of the request information, wherein the type of the request information is associated with a state of the target link in the target terminal, and wherein the pre-agreed interaction protocol is configured for specifying a response mode of the service party to link-related different information.

11. The electronic device according to claim 9, wherein the method further comprises: in response to the preview data transmitted by the target service party, transmitting the preview data to the target terminal, so that the target terminal generates a preview view of the target link.

12. The electronic device according to claim 11, wherein the transmitting the notification to the target service party according to a type of the request information, so that the target service party returns preview data of the target link, comprises:

determining that the request information is first-type request information, and transmitting the notification to the target service party, so that the target service party returns first-type preview data of the target link, wherein the first-type request information is transmitted by the target terminal in response to a target message being located in an information input box, the target message comprising the target link, and the first-type preview data is configured for generating a thumbnail preview view.

13. The electronic device according to claim 11, wherein the transmitting the notification to the target service party according to a type of the request information, so that the target service party returns preview data of the target link, comprises:

determining that the request information is second-type request information, and transmitting the notification to the target service party, so that the target service party returns second-type preview data of the target link, wherein the second-type request information is transmitted by the target terminal in response to receiving a target message in a session interface, the target message comprising the target link, and the second-type preview data is configured for generating a complete preview view.

14. The electronic device according to claim 13, wherein the request message is the second-type request information, and before responding to the second-type request information transmitted by the target terminal and related to the target link, the method further comprises: in response to third-type request information transmitted by the target terminal and related to the target link, transmitting a notification to the target service party, to notify the target service party that the second-type preview data of the target link is to be obtained, wherein the third-type request information is transmitted by the target terminal in response to transmitting the target message comprising the target link.

15. The electronic device according to claim 14, wherein, in response to request information transmitted by a target terminal and related to a target link, determining a target service party of the target link according to the registration information, and transmitting the notification to the target service party, so that the target service party responds to the target link according to the request information and the pre-agreed interaction protocol, comprises: in response to fourth-type request information transmitted by the target terminal and comprising operation information, transmitting a notification comprising the operation information to the target service party, so that the target service party performs processing according to the operation information; and the method further comprises: receiving a processing result returned by the target service party, wherein the fourth-type request information is transmitted by the target terminal in response to performing the operation information on a target message, the target message comprising the target link.

16. The electronic device according to claim 15, wherein the method comprises:

in response to the operation information being an operation of withdrawing the target message, the target service party performing processing according to the operation information, comprising: reclaiming a permission endowed by the target message in which the target link is located.

17. The electronic device according to claim 11, wherein the method comprises:

in response to receiving update data transmitted by the target service party, transmitting the update data to the target terminal, so that the target terminal updates the preview view of the target link.

18. The medium according to claim 10, wherein the method further comprises: in response to the preview data transmitted by the target service party, transmitting the preview data to the target terminal, so that the target terminal generates a preview view of the target link.

19. The medium according to claim 18, wherein the transmitting the notification to the target service party according to a type of the request information, so that the target service party returns preview data of the target link, comprises:

determining that the request information is first-type request information, and transmitting the notification to the target service party, so that the target service party returns first-type preview data of the target link, wherein the first-type request information is transmitted by the target terminal in response to a target message being located in an information input box, the target message comprising the target link, and the first-type preview data is configured for generating a thumbnail preview view.

20. The medium according to claim 18, wherein the transmitting the notification to the target service party according to a type of the request information, so that the target service party returns preview data of the target link, comprises:

determining that the request information is second-type request information, and transmitting the notification to the target service party, so that the target service party returns second-type preview data of the target link, wherein the second-type request information is transmitted by the target terminal in response to receiving a target message in a session interface, the target message comprising the target link, and the second-type preview data is configured for generating a complete preview view.

* * * * *